United States Patent
Moran et al.

(10) Patent No.: US 7,810,595 B2
(45) Date of Patent: Oct. 12, 2010

(54) SYSTEM AND METHOD FOR INITIATING OPERATION OF A FUEL CELL HYBRID VEHICLE

(75) Inventors: Brian D. Moran, La Mesa, CA (US); Robert C. Del Core, San Diego, CA (US); Christopher O. James, San Diego, CA (US)

(73) Assignee: ISE Corporation, Poway, CA (US)

( * ) Notice: Subject to any disclaimer, the term of this patent is extended or adjusted under 35 U.S.C. 154(b) by 0 days.

(21) Appl. No.: 12/565,980

(22) Filed: Sep. 24, 2009

(65) Prior Publication Data
US 2010/0133029 A1 Jun. 3, 2010

(51) Int. Cl.
*B60L 11/18* (2006.01)
(52) U.S. Cl. .................................................. 180/65.31
(58) Field of Classification Search ................ 180/65.1, 180/65.31, 65.8; 701/22; 429/12, 13, 22
See application file for complete search history.

(56) References Cited

U.S. PATENT DOCUMENTS

| | | | |
|---|---|---|---|
| 5,635,804 A * | 6/1997 | Tanaka et al. ............. | 318/139 |
| 6,484,830 B1 * | 11/2002 | Gruenwald et al. ..... | 180/65.245 |
| 6,815,100 B2 * | 11/2004 | Aoyagi et al. ............... | 429/13 |
| 6,885,920 B2 * | 4/2005 | Yakes et al. .................. | 701/22 |
| 7,109,686 B2 * | 9/2006 | Schulte et al. ............. | 320/167 |
| 7,492,055 B2 * | 2/2009 | Chiao .......................... | 307/9.1 |

* cited by examiner

*Primary Examiner*—Frank B Vanaman
(74) *Attorney, Agent, or Firm*—Stephen C. Beuerle; Procopio Cory Hargreaves & Savitch LLP

(57) ABSTRACT

The present disclosure provides a method and system for powering a hybrid electric vehicle with a fuel cell, and in particular, efficiently initiating power generation in the fuel cell, the method and system comprising electrically connecting a battery to an ultracapacitor-based propulsion energy storage; using the battery to charge the propulsion energy storage to a predetermined voltage level for powering an air delivery compressor for a predetermined amount of time; disconnecting the battery from the propulsion energy storage; electrically connecting the propulsion energy storage to the air delivery compressor; operating the air delivery compressor using the charge on the propulsion energy storage to provide a predetermined quantity of air to the fuel cell; and causing the fuel cell to generate electricity.

8 Claims, 9 Drawing Sheets

SYSTEM AND METHOD FOR INITIATING OPERATION OF A FUEL CELL HYBRID VEHICLE

FIELD OF THE INVENTION

The present invention relates generally to fuel cell hybrid electric vehicles (HEV), and more particularly, some embodiments relate to hybrid fuel cell motive unit start up procedures.

BACKGROUND OF THE INVENTION

Today, fuel cells are being developed to power passenger vehicles, commercial buildings, homes, and even small devices such as laptop computers. In addition to being a zero emission technology, fuel cell systems can be extremely efficient over a large range of sizes (from 1 kW to hundreds of megawatts). Current R&D focuses on the development of reliable, low-cost, high-performance fuel cell system components for transportation and buildings applications.

Although fuel cell technology is conceptualized as forming part of the path to energy independence for vehicles, commercialization of a fuel cell hybrid electric vehicle has been elusive. In general, cost and durability are the major challenges to fuel cell commercialization. Size, weight, and thermal and water management are also barriers to the commercialization of fuel cell technology. Moreover, in transportation applications, these technologies face more stringent cost and durability hurdles. With the very limited commercialization of fuel cell vehicles, many problems unique to these applications go unrecognized and thus unsolved.

SUMMARY

According to various embodiments of the invention, systems and methods are provided to allow a vehicle's existing power transmission system to be exploited for starting a fuel cell without the use of an additional DC-to-DC converter high voltage battery. In these embodiments, generally, a small battery is coupled to the vehicle's power transmission system and used to charge the vehicle's ultracapacitor (propulsion energy storage) to a predetermined voltage level. Once the ultracapacitor has been sufficiently charged, the ultracapacitor is used to power an air delivery compressor until the fuel cell can begin generating power.

According to an embodiment of the invention, a method for initiating power generation in a fuel cell of a hybrid fuel cell electric vehicle, comprises electrically connecting a battery to an ultracapacitor; using the battery to charge the ultracapacitor to a predetermined voltage level for powering an air delivery compressor for a predetermined amount of time; disconnecting the battery from the ultracapacitor; electrically connecting the ultracapacitor to the air delivery compressor; operating the air delivery compressor using the charge on the ultracapacitor to provide a predetermined quantity of air to the fuel cell; and causing the fuel cell to generate electricity Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Figure 1A:
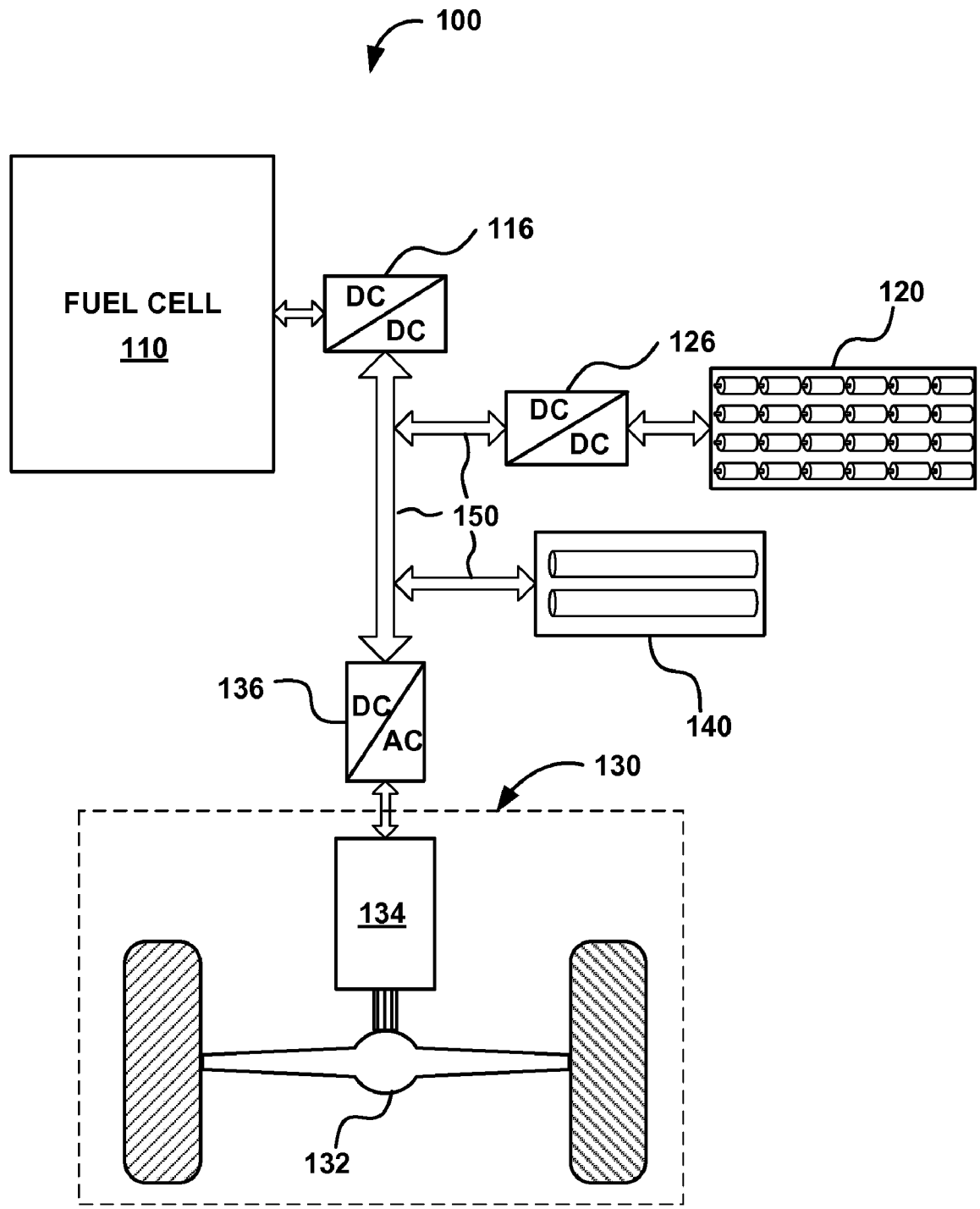
FIG. 1A illustrates a schematic of an exemplary fuel cell hybrid-electric drive system.
Figure 1B:
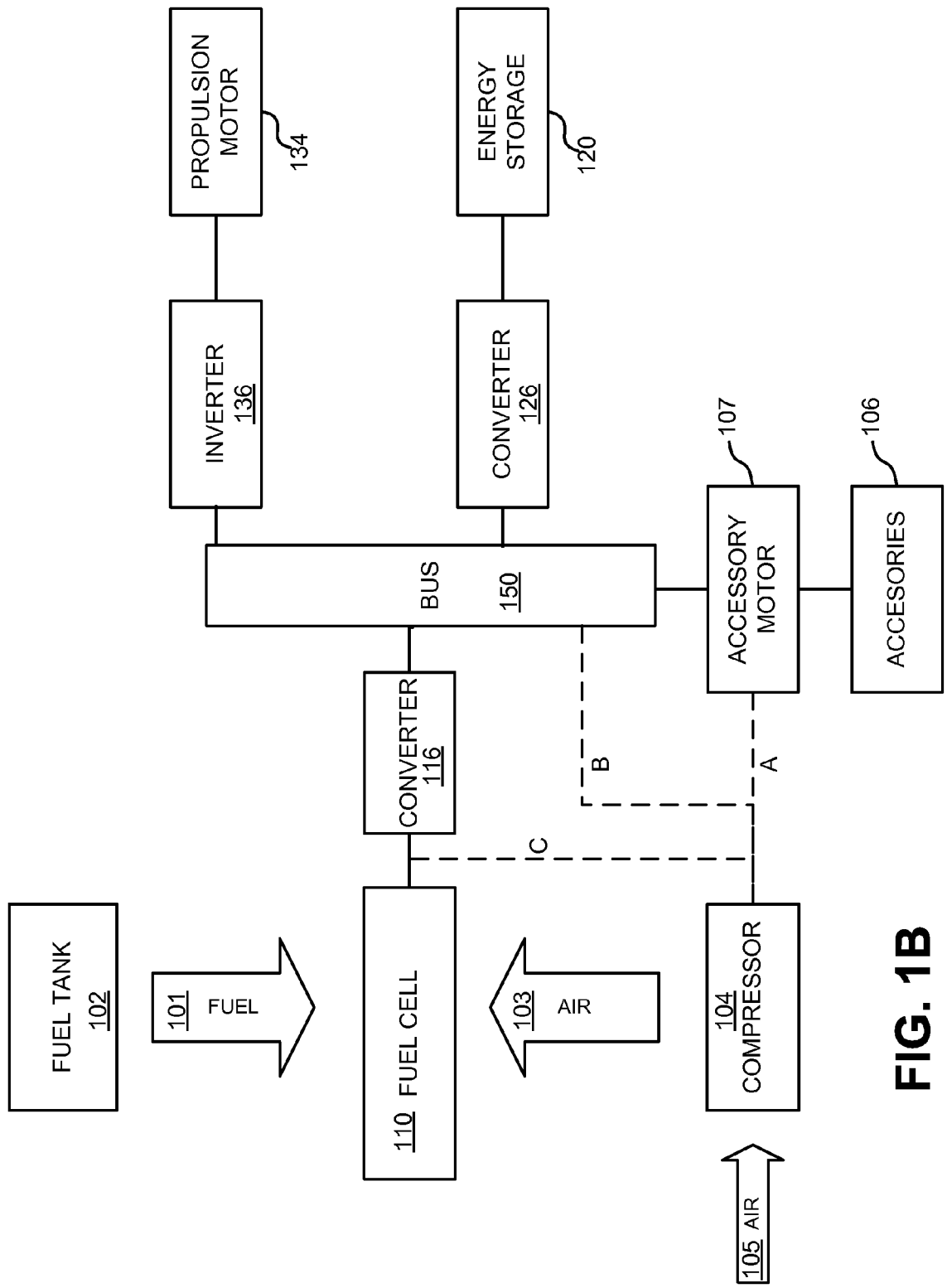
FIG. 1B illustrates a schematic of a motive power system for a fuel cell hybrid electric vehicle.
Figure 1C:
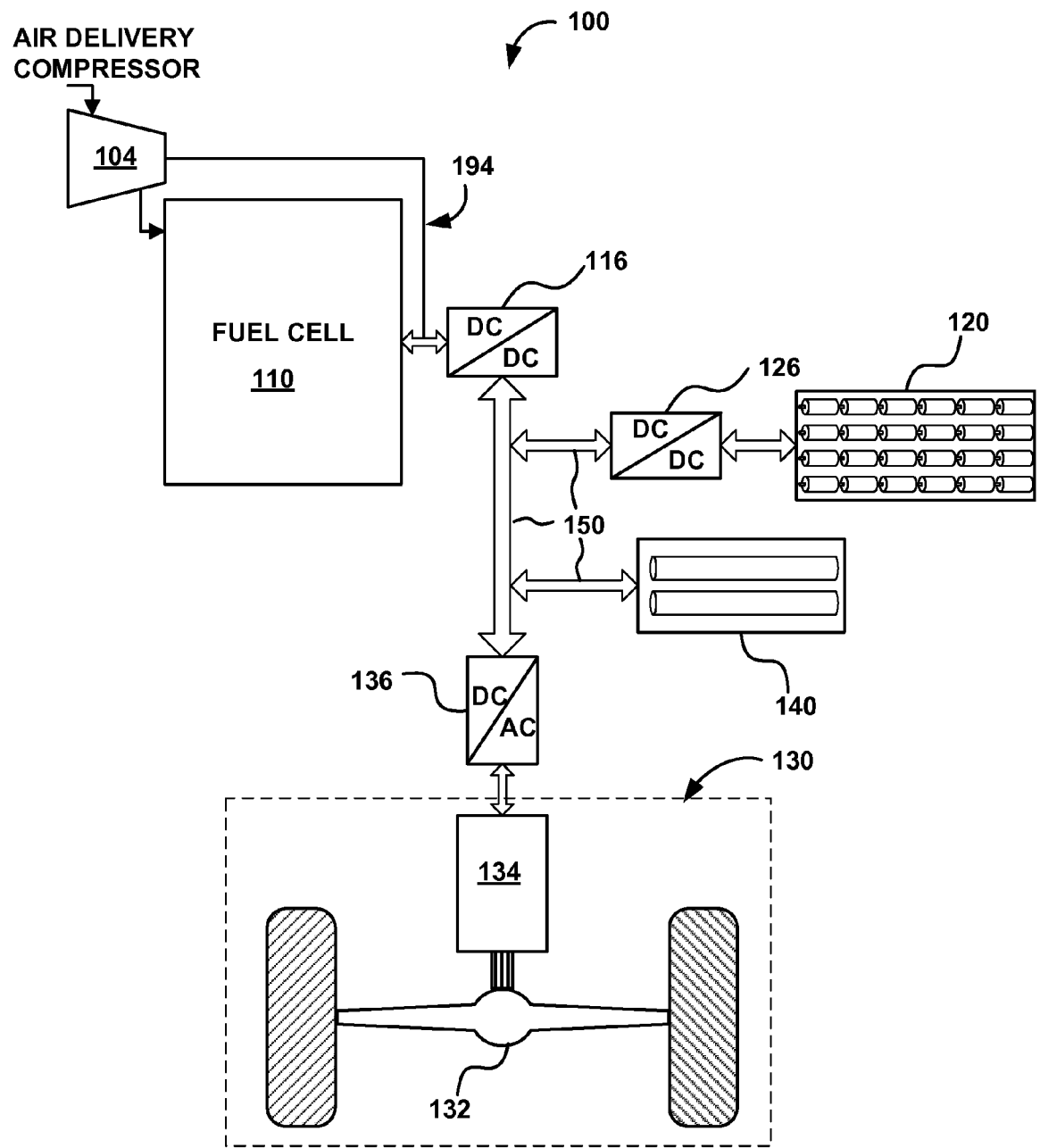
FIG. 1C illustrates a schematic of a preferable configuration fuel cell hybrid electric drive system 100.

Referring to FIGS. 1A-1C, depicting a drive system 100 of a fuel cell hybrid vehicle, a fuel cell 110 is used to provide motive energy for propelling the vehicle. In general, the fuel cell 110 operates by combining a fuel 101, such as hydrogen, with an oxidation source, such as molecular oxygen gas 103, to generate electricity through the oxidation of a fuel. In some hybrid fuel cell electric vehicles, both oxygen and hydrogen 101 may be compressed and stored onboard the vehicle. In other hybrid vehicles, the hydrogen may be stored onboard the vehicle and the oxygen is provided to the fuel cell using an air delivery compressor that compresses atmospheric air 105 and provides the compressed air 103 to the fuel cell at appropriate levels.

FIG. 1A, illustrates a schematic of an exemplary fuel cell hybrid-electric drive system. Fuel cell HEV drive system 100 uses a fuel cell 110 and a propulsion energy storage pack or module 120 to provide electric propulsion power to its drive wheel propulsion assembly 130. In particular, the fuel cell 110 will generate electricity to power electric propulsion motor 134 and/or charge the energy storage 120. From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

The propulsion energy storage pack or module 120 may be made up of a plurality of energy storage cells. During operation, energy storage 120 may solely power the electric propulsion motor 134 or may augment power provided by the fuel cell 110. The energy storage design may vary in light of the vehicle's drive cycle, its physical parameters, and its performance requirements. For example, energy storage pack 120 for heavy-duty vehicles (here, having a gross weight of over 10,000) may include 288 ultracapacitor cells, the pack having a rated DC voltage of 650 VDC and storing 600 Wh of energy.

As a key added feature of HEV efficiency, many HEVs recapture the kinetic energy of the vehicle via regenerative braking rather than dissipating kinetic energy via friction braking. In particular, regenerative braking ("regen") is where the electric propulsion motor 134 are switched to operate as generators, and a reverse torque is applied to the drive wheel assembly 132. In this process, the vehicle is slowed down by the electric drive motor 134, which converts the vehicle's kinetic energy to electrical energy. As the vehicle transfers its kinetic energy to the motor 134, now operating as a generator, the vehicle slows and electricity is generated and stored in the energy storage 120.

When the energy storage 120 reaches a predetermined capacity (e.g., fully charged), the drive wheel propulsion assembly 130 may continue to operate in regen for efficient braking. However, instead of storing the energy generated, any additional regenerated electricity may be dissipated through a resistive braking resistor 140. Typically, the braking resistor 140 will be included in a cooling loop that will dissipate the excess energy as heat.

Since the fuel cell HEV drive system 100 may include multiple energy sources (i.e., fuel cell 110, energy storage 120, and drive wheel propulsion assembly 130 in regen), in order to freely communicate power, these energy sources may then be electrically coupled to a power bus, in particular a DC high power/high voltage bus 150. In this way, energy can be transferred between components of the high power hybrid drive system as needed. In addition, HEV drive system 100 may include one or more DC-to-DC converters (step-up converter and/or step-down converter) 116, 126 to boost up or buck down voltages of electricity transmitted across the DC bus 150.

The fuel cell HEV may further include both AC and DC high power systems. For example, the electric drive motor 134 may run on and generate (in regen) high power AC, whereas fuel cell 110 and energy storage 120 use DC. Accordingly, the current may be converted via an inverter/rectifier 136 or other suitable device (hereinafter "inverters" or "AC-DC converters"). As illustrated, HEV drive system 100 includes an inverter 136 interspersed between the electric drive motor 134 and the DC high power bus 150.

The fuel cell HEV may further include both a high and low voltage electrical system. In this vehicle application, the delineation between high and low voltage is at 50 VDC. For example, in certain embodiments, the high voltage system may be on the order of 650 VDC, which is above 50 VDC, and the low voltage system is on the order of 24 VDC, which is below 50 VDC. In general, the high voltage electrical system will be run by the hybrid vehicle drive system 100 and its associated subsystems (e.g., electric drive motors, fuel cell, inverters, etc.), whereas the low voltage electrical system will run the traditional vehicle accessories (e.g., lighting, vehicle communications, hybrid drive system controls, etc.). Given the potential for inadvertent exposure to people and/or vehicle components powered by the low voltage system, the high voltage system is electrically isolated from the low voltage system, or "floating", and does not have a chassis ground. Each vehicle electrical systems will include an energy storage device. For example, the low voltage system will typically include a 12 or 24 VDC battery (e.g., "car battery"), whereas the high voltage system may include a 600-800 VDC ultracapacitor-based propulsion energy storage, similar to that described above.

In operation, the fuel cell HEV may include a mode of operation where the vehicle operates with its engine shut down, running entirely off stored energy ("EV mode"), as the HEV is operating as a purely electric vehicle ("EV"). In contrast, under normal conditions, the fuel cell HEV is operating wherein the fuel cell runs as needed to generate propulsion energy ("Hybrid mode").

In HEV mode, the drive system 100 is configured to receive propulsion energy from the fuel cell 110 and/or the energy storage 120. Moreover, in HEV mode the fuel cell's DC-to-DC converter 116 is active (as well as DC/DC 126 and DC/AC 136), and it modulates the output voltage of the fuel cell 110 to the bus voltage required of the DC bus 150 (e.g., from 200-300 VDC to 650-700 VDC). It is understood that here, and throughout this disclosure, voltages and power rating may vary according to the requirements of the drive system, and are provided here only to aid in illustrating the invention.

In EV mode, the drive system 100 is configured to receive propulsion energy from the energy storage 120 alone (and from regen where applicable). Moreover, in EV mode the DC-to-DC converter 126 is active (as well as DC/AC 136), and it converts the output voltage of the propulsion energy storage 120 to the bus voltage required of the DC bus 150 (e.g., from 0-700 VDC to 650-700 VDC).

As discussed above, it is preferable that the fuel cell hybrid vehicle carry as little weight as possible. By using atmospheric air, weight can be reduced, and/or hydrogen fuel capacity can be increased. In these vehicles, however, the air must first be compressed if the vehicle is to meet even minimal performance demands of a driver. Thus, current fuel cells require forced air for operation. This is especially true where the vehicle is a heavy-duty vehicle, such as a tractor-trailer, metropolitan transit bus, a refuse collection vehicle, etc. Given the propulsion demands of these vehicles, oxidation air must then be delivered both compressed and at a high mass flow rate via an air delivery compressor.

FIG. 1B, illustrates a schematic of a motive power system for a fuel cell hybrid electric vehicle. As above, fuel cell 110 uses air 103 and fuel 101 to generate electricity used to power a propulsion motor 134. As illustrated, the fuel 101 is provided as compressed hydrogen via a hydrogen fuel tank 102. However, the oxidant (air) 103 is provided via an air delivery compressor 104. Air delivery compressor 104 then compresses atmospheric air 105 to meet the oxygen requirements of fuel cell 110.

Fuel cell 110 may occasionally generate more energy than is required to operate the propulsion motor 134 and other vehicle accessories 106 and 104. In this situation, the system may route the excess energy to the energy storage module 120. The excess energy stored in storage module 120 can then be used to propel the vehicle by powering the propulsion motor 134 and one or more power accessories 106 within the vehicle using accessory motor 107. According to one embodiment, one or more of accessories 106 may be powered by DC bus 150 via a DC-to-DC converter (not shown).

As above, the transfer of energy between and among fuel cell 110, energy storage module 120, accessory motor 107, and propulsion motor 134 is achieved using a high-voltage bus 150. Likewise, the various devices connected to bus 150 may be coupled to intermediary voltage converters that enable the power needs of the devices to be synchronized. For example, the voltage converters may comprise DC-to-DC voltage converters, DC-to-AC inverters, or combinations thereof 116, 126, 136.

As illustrated, air delivery compressor 104 may be driven by an accessory motor 107 (dashed-line path A), which may be powered with electricity provided by the high power system. Alternately, air delivery compressor 104 may be driven by an integrated electric motor. The electric motor may be electrically coupled to DC bus 150 for power (dashed-line path B). Whether through an integrated motor or a separate accessory motor 107, the air delivery compressor 104 requires electricity to operate. This electricity may be provided by an onboard propulsion energy storage device 120, or provided by the fuel cell 110 itself (dashed-line path C).

FIG. 1C illustrates a schematic of a preferable configuration of fuel cell hybrid electric drive system 100. As shown, with reference to fuel cell 110, the air delivery compressor 104 is preferably electrically upstream of the fuel cell's DC-to-DC converter 116. In particular, compressor 104 is electrically in parallel with fuel cell 110 with reference to fuel cell DC/DC 116, sharing an electrical node on line 194. This placement advantageously avoids inverter losses when powering the compressor 104 directly off the fuel cell 110. In addition, the air delivery compressor 104 may be electrically in parallel with the fuel cell with reference to the DC-to-DC converter 116.

To start up the fuel cell stack 110, stored energy in the propulsion energy storage 120 may be used to initially operate the air delivery compressor 104 and the drive system controls. In the alternate or where there is no stored power available, external power may be needed to initially operate the air delivery compressor and the drive system controls to start up the fuel cell stack 110. External power may be plugged into the vehicle from a stationary source.

With regard to a fuel cell hybrid drive system 100 using the propulsion energy storage 120 to start the air delivery compressor 104 and thus the fuel cell 110, there may be situations where the energy storage 120 is unable to start the fuel cell 110. For example, ultracapacitor-based propulsion energy storage 120 may include a plurality of energy storage cells that integrate some form of cell balancing such as balancing resistors (not shown). Given enough time (e.g., overnight) balancing resistors may passively discharge the propulsion energy storage 120. Likewise, other conditions that may leave the propulsion energy storage 120 discharged include, for example, active discharge for maintenance, or a fuel cell 110 shut down on the road, combined with energy depletion of the ultracapacitor pack 120. In these and other scenarios, the vehicle will not be able to start itself and will require external power.

To overcome this limitation, a dedicated power source, such as a battery, may be added to the vehicle to operate the compressor during the start up phase when neither the fuel cell nor the ultracapacitor are available. However, the type of high flow air compressors needed to oxygenate the fuel cell of a heavy duty vehicle will often have high voltage/power requirements (e.g., 200-400 VDC), which are not easily met using commercially available low voltage batteries (e.g., 6/12/24 VDC). As such, to provide a fuel cell hybrid electric vehicle with onboard starting that is independent of the propulsion energy storage 120, the drive system would require a dedicated high power battery, which would likely also require a high power, low volt-to-high volt DC/DC converter. Accordingly, independent starting via a dedicated battery may add significant cost, weight, and system complexity to the vehicle.

Figure 2:
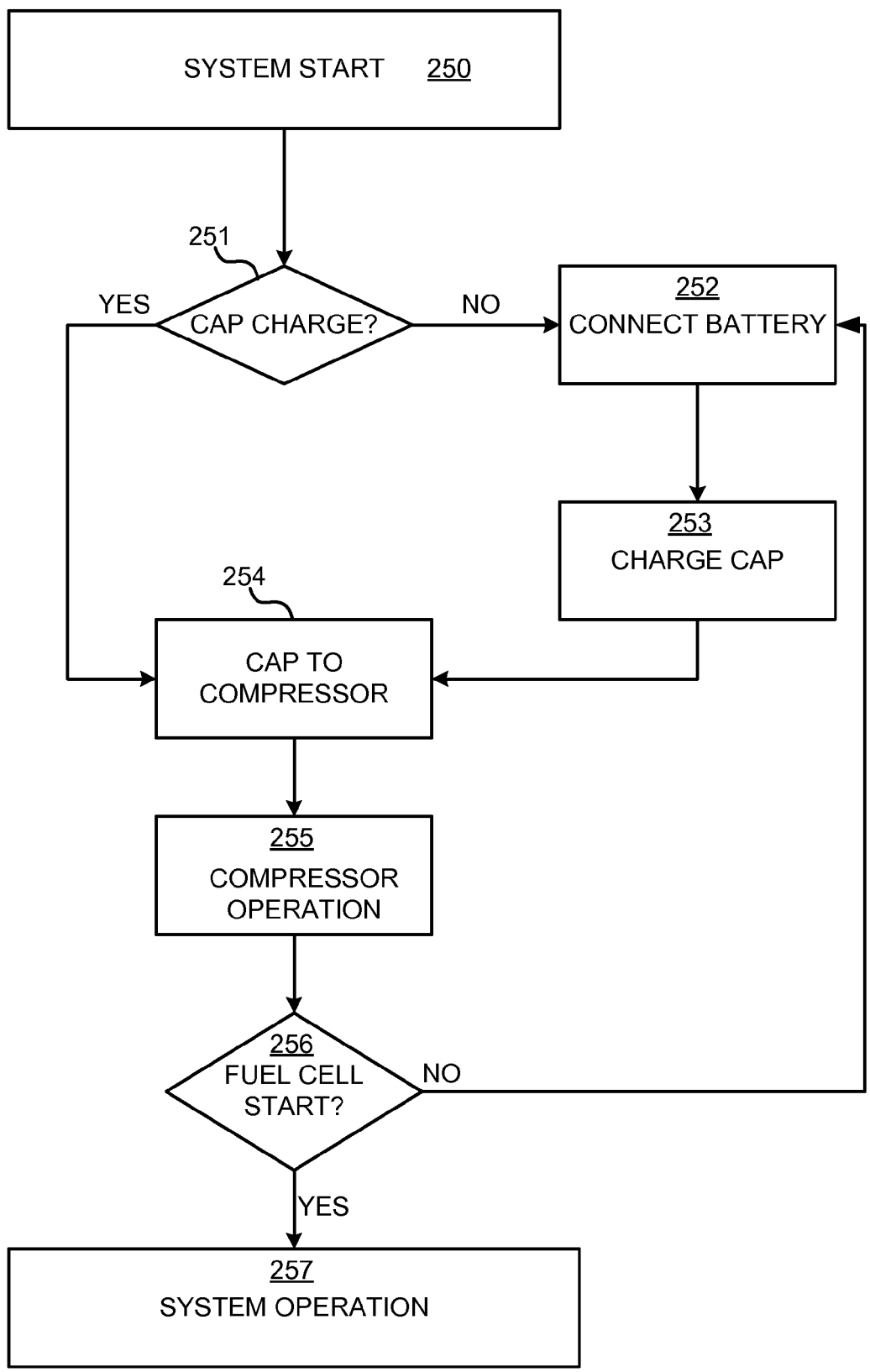
FIG. 2 illustrates a method of fuel cell startup according to an embodiment of the invention.

FIG. 2 illustrates a method for fuel cell initiation in a hybrid vehicle employing an ultracapacitor-based energy storage. In particular, the inventors have discovered an efficient method for independently starting the fuel cell by reconfiguring components of the preexisting drive system, along with minor hardware modifications, and controlling power flows with software. Thus, complexity, parts count, and cost are minimized. In general, a low voltage battery (e.g., 12 VDC) is coupled to the ultracapacitor via the DC bus, where the bus voltage is boosted to allow the ultracapacitor to receive a higher charge. The system is then switched over to power the compressor, and thus start the fuel cell. According to one preferable embodiment, the method includes providing a low voltage that is separate and independent from the vehicle's low voltage battery. In this way, the separate battery or boost battery will not compromise isolation during start.

As illustrated, system startup 250 begins with inspecting the charge 251 stored on the ultracapacitor. In some applications, the vehicle fuel cell will not instantly begin generating electricity when air and fuel are first applied. Accordingly, sufficient charge must be stored on the ultracapacitor such that the compressor can be operated until the fuel cell begins generating electricity. In a particular embodiment, a fuel cell may take between 3 and 5 seconds to begin electricity production. If a sufficient charge remains stored in the ultracapacitor, for example if the vehicle was only recently shut down, then the ultracapacitor may be connected to the compressor 254 to allow the compressor to be run off of the charge stored in the ultracapacitor until the fuel cell begins electricity generation.

However, if there is not a sufficient charge on the ultracapacitor, for example if the vehicle was shut down overnight, or if the vehicle was shut down with a discharged capacitor, then a battery is connected 252 to charge the ultracapacitor. In addition, to increase the lifetime of the battery, if the ultracapacitor is discharged below the voltage of the battery, the system may electrically couple a load between the battery and ultracapacitor to limit the current leaving the battery.

After the battery is connected 252, the ultracapacitor is charged 253 to a sufficient level to operate the air delivery compressor. In many embodiments, the air delivery compressor requires high voltages for operation. For example, a scroll air delivery compressor might require more than a 500 VDC current to operate. Providing this current from a standard 24 or 28 VDC battery would require an expensive low volt to high volt DC-to-DC converter, increasing system complexity and potential points of system failure. However, a pre-existing high voltage bus may be exploited to connect a standard battery to the vehicle's ultracapacitor. Because a capacitor accumulates charge in proportion to the time it is connected to a voltage source, the inventors have further discovered that a relatively low voltage battery (for example a standard 12 V automotive battery or small 24 V battery) can be used to induce a sufficient charge on ultracapacitor to operate the compressor. Furthermore, utilizing the capacitor removes the requirement to add an additional low volt to high volt DC-to-DC converter.

In this embodiment, after the capacitor is connected to the compressor 254, the compressor begins operation 255. As described herein, the capacitor is only able to power the compressor for a relatively short period, for example 5 seconds. Accordingly, if the fuel cell starts 256 within that period, then normal system operation 257 begins, and the fuel cell provides the power for vehicle operations. However, if the fuel cell does not start within the available period, then the battery is reconnected and the method repeats from step 252.

Figure 3A:
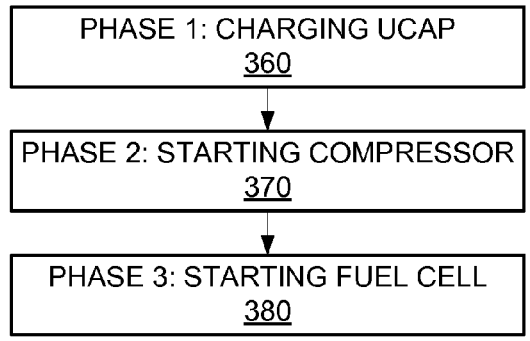
FIG. 3 illustrates a system controller process flow according to an embodiment of the invention.
Figure 3B:
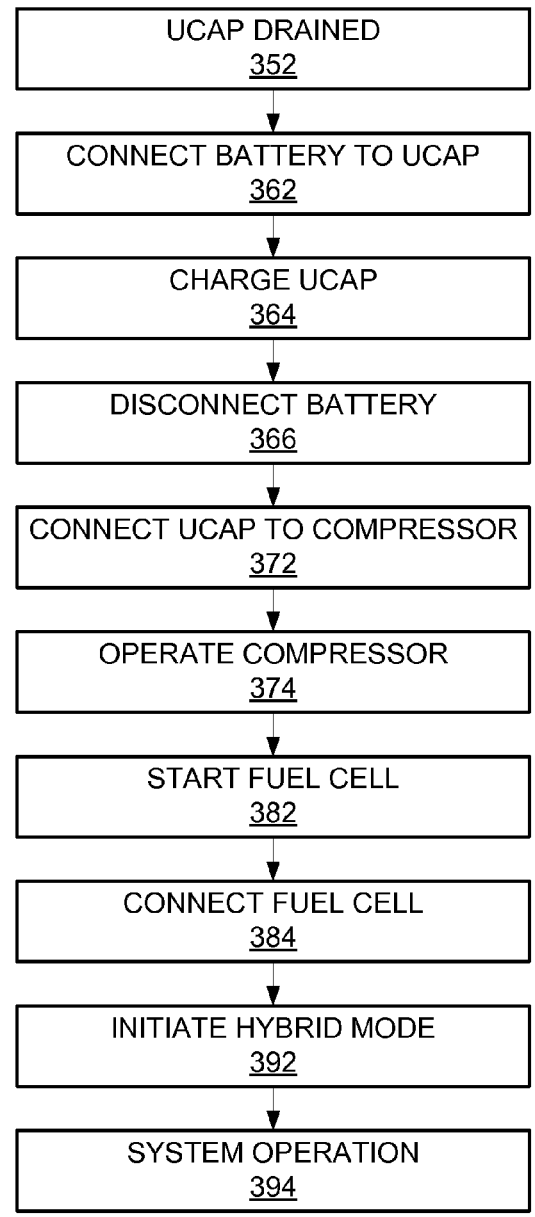

FIGS. 3A and 3B illustrate a system process flow according to an embodiment of the invention. In some embodiments, this process may be implemented by a vehicle's system control unit.

Referring to FIG. 3A, in general, starting up the fuel cell is performed in three phases: Charging the ultracapacitor propulsion energy storage 360 (also see FIG. 4), Starting the air delivery compressor 370 (also see FIGS. 5A-5B), and Starting the fuel cell 380 (also see FIG. 6). It is understood that, under certain circumstances (e.g., where the system requires a different order of operation), the steps may be performed in a different order than shown.

Referring to FIG. 3B, the process begins with the condition of a drained ultracapacitor propulsion energy storage 352. This situation may occur in vehicles that automatically drain an ultracapacitor at system shutdown, for safety purposes, or may occur when the vehicle has remained shut down for a sufficient length of time that the ultracapacitor has drained.

According to the illustrated method, the first phase of charging the ultracapacitor 360 begins with connecting an onboard battery or an external battery to a system power link 362. For example, as described herein, the system power link may comprise a high voltage bus and the battery may comprise a 12 VDC automotive battery.

In this embodiment, after the battery is connected to the power link 362, the system places the link in condition to allow the capacitor to be charged. For example, the system may initiate a hybrid mode that places the system high voltage bus in condition to boost and transfer DC current at the voltage required to charge up the ultracapacitor. In this example, the hybrid mode may be the same configuration, or a substantially similar configuration that is used when the vehicle is operated using the fuel cell.

After the system is placed in the state required for capacitor charging, the ultracapacitor propulsion energy storage is allowed to charge 364 to the voltage required to operate the compressor for the predetermined period of time. In particular, the compressor must be powered for sufficient time to operate the fuel cell to the level where its output is sufficient to sustain fuel cell operation. For example, according to embodiment, the ultracapacitor may be required to provide current of at least 50 VDC for a period of 5 seconds or more. In this embodiment, the discharge rate of the ultracapacitor dictates that the ultracapacitor be charged to at least 100 V because the ultracapacitor will decay from 100 V to 50 V within approximately 5 seconds.

In this embodiment, once the ultracapacitor has been sufficiently charged 364, the battery is disconnected 366 to prevent further charging and to return connection to the higher voltage of the fuel cell link. This may also allow the fuel cell to be connected using the same connection location as the battery.

According to one embodiment, the second phase of starting the air delivery compressor 370 begins after the ultracapacitor has been charged 364 and the battery has been disconnected 366. In particular, the system may enter a state that allows the compressor to be operated directly from the capacitor 372. For example, the system may initiate an electric vehicle mode that causes the high-voltage bus to transmit electricity at an elevated voltage (e.g., 500 VDC). Air compression 374 may begin once the system is ready to transmit electricity from the ultracapacitor to the compressor. Alternately, the fuel cell may require being connected before airflow begins, in which case the second and third phase are reversed in order and/or combined.

The third phase of starting the fuel cell 380 begins once air begins flowing to the fuel cell; the fuel cell may be started 382 and connected 384 to the power transmission system. According to one embodiment, the fuel cell 110 may be connected to the power transmission system as part of the earlier disconnecting of the battery 366, as discussed below. In addition, connecting the fuel cell to the power transmission system may include applying an electrical load across the output of the fuel cell 110. It is understood that the load may be applied at any point in the power transmission circuit, for example, at the DC bus 150.

Some fuel cells that may be employed in embodiments of the invention have strict operational requirements. For example, attempting to operate a fuel cell outside of a stoichiometric relationship of air, fuel, and electrical current may damage or severely decrease the life of the fuel cell. Accordingly, in addition to maintaining the fuel and air supply in proper proportion, a sufficient electrical load must be placed on the fuel cells such that the amount of current produced by the fuel cell is completely utilized. In some embodiments, this load may be created by connecting 384 the fuel cell to the vehicle accessory system 106, 107 or braking resistors 140.

In the illustrated embodiment, once the fuel cell is operating, the system connects the fuel cell to the motive power unit and begins system operations 394. In some embodiments, this may comprise initiating a system hybrid vehicle mode 392 that configures the high-voltage bus to transmit high volt DC current at a level configured for fuel cell vehicle operation. For example, the hybrid vehicle mode might comprise raising the high-voltage bus to approximately 700 V DC and using power generated by the fuel cell to propel the vehicle by powering the vehicle's motive unit or to charge the vehicle's ultracapacitor.

Figure 4:
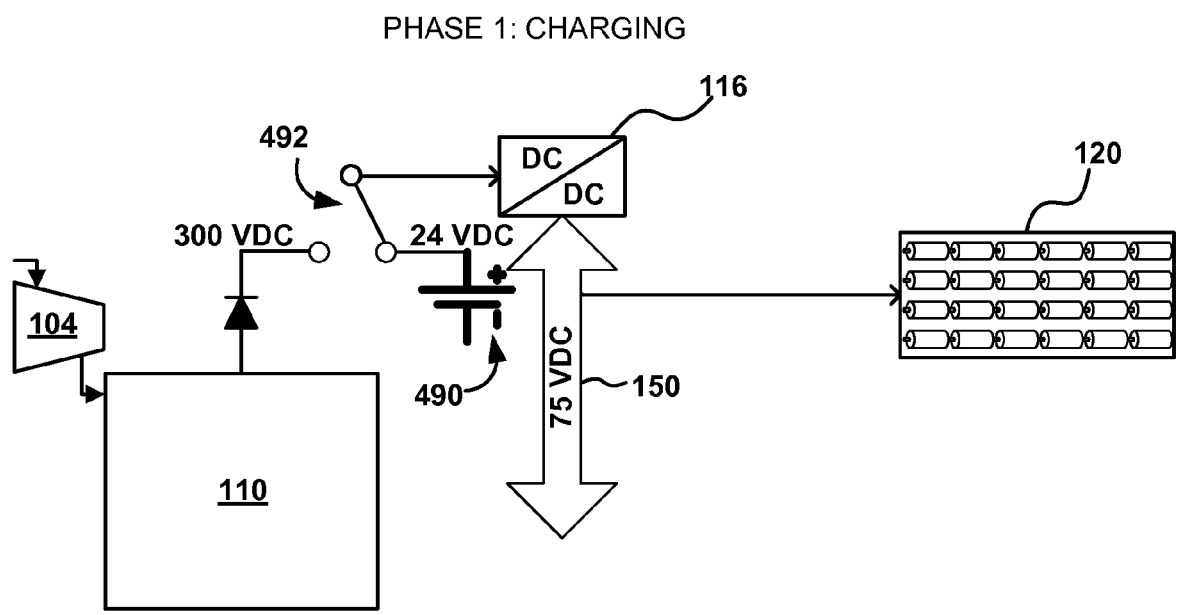
FIG. 4 illustrates a schematic of an exemplary drive system configuration during phase one (ucap charging).

FIG. 4 illustrates a schematic of an exemplary drive system configuration during phase one (charging) according to one embodiment of the invention. Here, a low voltage battery 490 (bold) is the power source. Low voltage battery 490 is electrically coupled to the propulsion energy storage 120 via switch 492 and DC power bus 150. Preferably, switch 492 is configured to electrically couple and decouple battery 490 from the power path between fuel cell 110 and the energy storage 120. Fuel cell 110 is also illustrated having a current limiting device, such as a diode, to prevent reverse flow into the fuel cell 110. Here, arrows are used to indicate the direction of energy flow from the LV battery 490 towards the energy storage 120.

Preferably, low voltage battery 490 is a commercially available 12 VDC or 24 VDC "car battery". Optionally, two 12 VDC batteries may be coupled in series to form a 24 VDC source. It is understood that other batteries may be used wherein the battery's energy storage capacity is compatible with the compressor's start up requirements.

Here, in contrast to the traditional use of a car start up battery, battery 490 is not powering a machine, but rather is charging up an ultracapacitor. In this way, a much lower current is demanded over a period of time (t1). According to one embodiment, the period of time (t1) may be on the order of 10 seconds to 15 seconds, depending on the battery output and compressor requirements.

In addition, a DC-to-DC converter may be used to boost the voltage of the battery to allow the ultracapacitor pack 120 hold a higher charge and thus store more energy. According to one embodiment, the ultracapacitors 120 may only need to be charged to 75 VDC. The DC/DC converter may be the DC converter 116 used for boosting the voltage of the fuel cell's output energy. In the alternate, since this configuration only needs limited boosting (e.g., boost to 75 VDC, instead of to boost to 650 VDC), the DC/DC converter may be a relatively inexpensive, dedicated DC converter. Preferably, the DC/DC converter is selected with a sufficiently high boost ratio (i.e. going below the battery's rated voltage). In this way, the system is capable of starting from very low voltage, such as from a flat battery, or even a jump start from an automobile or motorcycle. It is understood that other voltage limits may be used, as appropriate, but will generally be greater than the voltage of the battery 490.

Figure 5A:
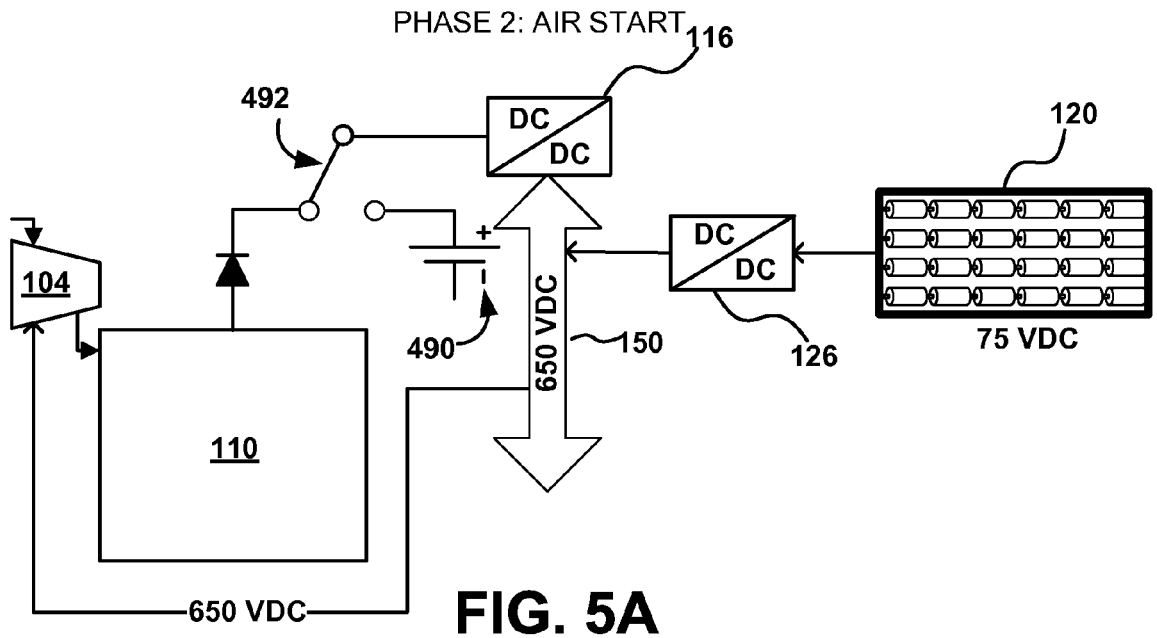
FIG. 5A illustrates a schematic of an exemplary drive system configuration during phase two (air start).
Figure 5B:
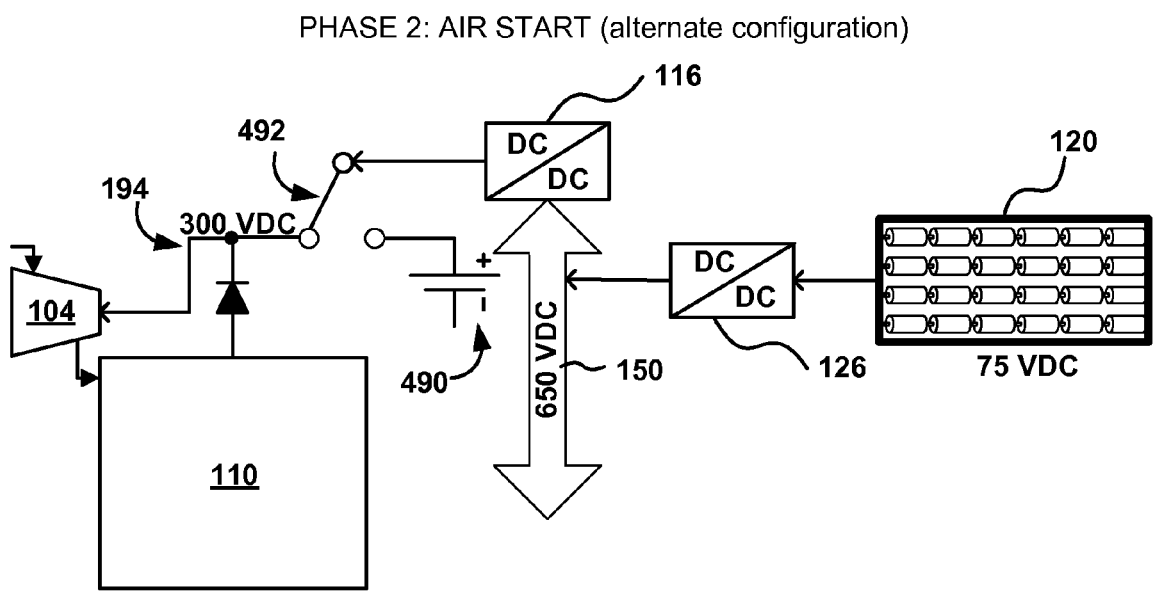
FIG. 5B illustrates a schematic of an alternate exemplary drive system configuration during phase two (air start)

FIGS. 5A and 5B illustrate a schematic of an exemplary drive system configuration during phase two (air start). In both figures, charged propulsion energy storage 120 (bold) is the power source. Preferably, DC-to-DC converter 126 is operated such that the voltage of the ucap pack 120 is boosted to the DC bus voltage in a similar manner as when the vehicle is operating in EV mode (or otherwise being powered by the ucap pack 120). In this way, drive system power controls need not be modified. In the alternate, the DC converter 126 may be down-rated to only boost up to a compressor operating voltage. According to one embodiment, the air start period of time (t2) may be on the order of less than 5 seconds, depending on the energy storage pack's 120 output and the compressor 104 requirements.

Referring to FIG. 5A, according to one embodiment of the invention, air delivery compressor 104 is powered from the energy storage 120, directly from DC bus 150. This has the benefit of simply powering the compressor 104 as an accessory off the DC power bus 150, and needing minimal reconfiguration of the power controls. In the alternate, air delivery compressor 104 may be powered from the energy storage 120 via an accessory motor 107 powered from the DC bus 150 (see e.g., FIG. 1B dashed-line path A).

Referring to FIG. 5B, according to one alternate configuration, air delivery compressor 104 is powered from the energy storage 120 via the DC bus 150 and the fuel cell's DC-to-DC converter 116. As illustrated, compressor may be electrically in parallel with the fuel cell, with reference to the DC-to-DC converter 116. Accordingly, compressor is powered via the node comprising switch 492 and power line 194. In is understood that additional hardware may be included in the compressor's 104 power path, but is not shown in this simplified schematic.

According to one embodiment, the voltage of the DC bus 150 may be higher than the operation voltage of the compressor 104. Thus, here, fuel cell DC/DC 116 may be configured to buck down the power coming off the DC bus to an operation voltage of the compressor 104. For example, the drive system 100 may have a DC power bus voltage of 650 VDC whereas the compressor operation voltage is on the order of 300 VDC. It is understood that these voltages are provided for illustration, and are in no way limiting.

Figure 6:
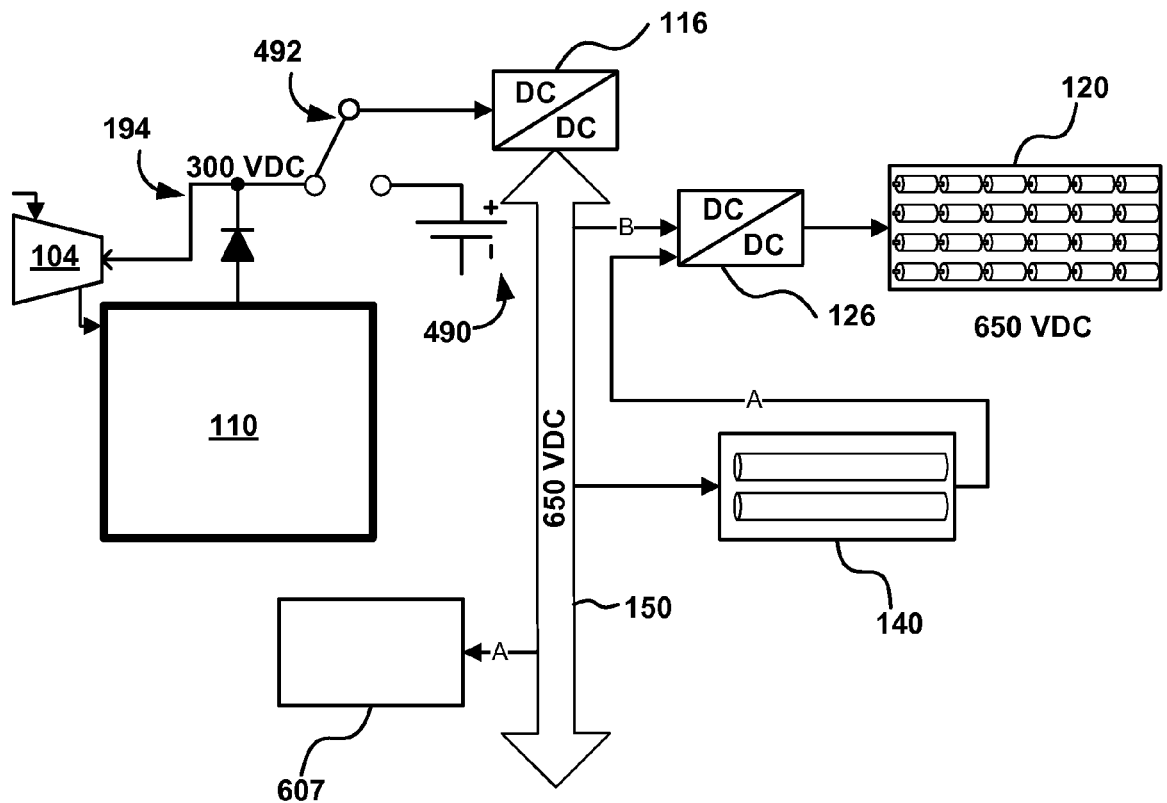
FIG. 6 illustrates a schematic of the drive system configuration during phase three (fuel cell start).

FIG. 6 illustrates a schematic of the drive system configuration during phase three (fuel cell start) according to one embodiment of the invention. Here, fuel cell 110 (bold) is the power source. In this embodiment, the system 100 has allowed ultracapacitor 120 is to discharge, thereby powering the compressor 104 for a sufficient period to allow fuel cell 110 to begin operating. In this embodiment, switch 492 is configured to couple the fuel cell electrical output to high-voltage bus 150 by way of boost converter 116.

As discussed above, an electric load may be placed across the fuel cell 110 and controlled such that a precise stoichiometric balance of air, fuel, and electrical current is maintained during the fuel cell start up process. In particular, as the vehicle will typically not have any power demands at start up, an electrical load may be applied to control the current draw from the fuel cell. For example, since the ultracapacitor pack 120 will be substantially discharged, electrically coupling it to the fuel cell may draw too much current and place unnecessary stress on the fuel cell. In the alternate, absent any load, the fuel cell may experience an "open circuit condition", which may result in membrane drying in proton-exchange membrane fuel cells. This, may not be immediately noticeable, however, over time, these incremental start up stresses may result in performance degradation, and/or reduce the lifetime of the fuel cell. Thus, as above, this electrical load may be created and controlled by operating the accessory system 607 or braking resistors 140 such that the current draw is first limited (path 'A') to match the airflow of the air delivery compressor 104 as it ramps up. Once the fuel cell is fully operational, the hybrid drive system may operate in full hybrid mode (path 'B') and begin charging the ultracapacitors 120.

According to one embodiment, the ucap pack 120 may further be "pre-charged" by passing current through the braking resistor 140 prior to electrically coupling it to the DC bus 150. In this way the current may be limited, and further extend the live of the interface (e.g., IGBT contactors, or other switching) between the ultracapacitor pack 120 and the DC power bus 150. Otherwise, the interface may be exposed to high current spikes due to the potential differential between the DC bus and the substantially empty ucap pack 120. Upon "pre-charging" the pack 120, it may be directly coupled to the DC bus 150 along path 'B'.

Figure 7:
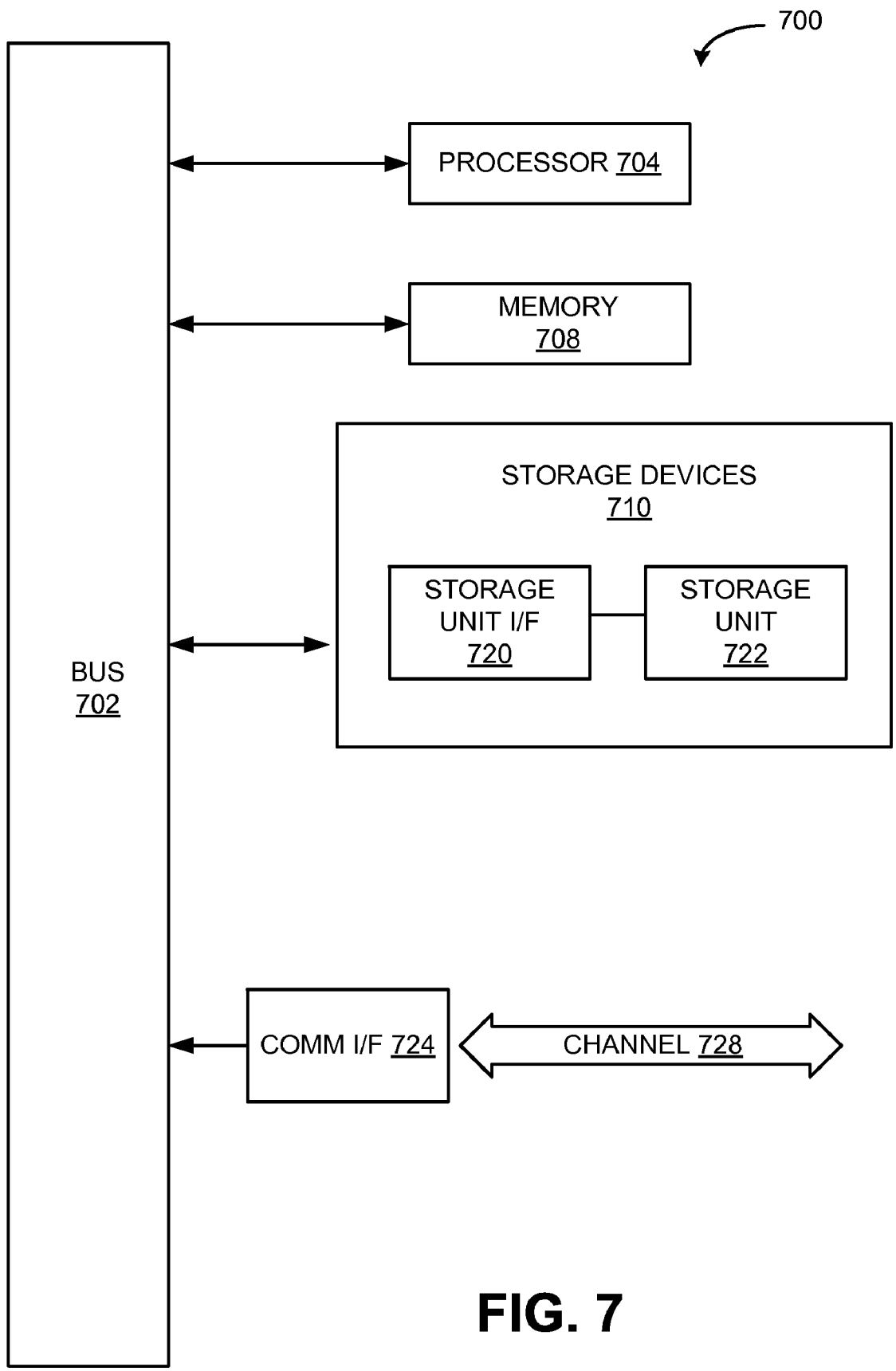
FIG. 7 illustrates an exemplary computing module with which various features of some embodiments of the invention may be implemented.

In some embodiments, various systems operations described herein may be performed by a system controller comprising a computing module. For example, one such computing module is shown in FIG. 7. Various embodiments are described in terms of this example-computing module 700. After reading this description, it will become apparent to a person skilled in the relevant art how to implement the invention using other computing modules or architectures. Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a storage unit interface 720. Examples of such storage units 722 and interfaces 720 can include: a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a CAN bus, a cellular link, an RF link, an optical link, a network interface, and other wired or wireless communications channels.

In this document, the terms "computer program medium" and "computer usable medium" are used to generally refer to media such as, for example, memory 708, storage unit 722, and signals on channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements. Accordingly, such description shall not require or imply that separate hardware or software components are used to implement such features or functionality. Although the term "ultracapacitor" is used singularly herein, one of ordinary skill in the art will understand that ultracapacitor can refer to one or a plurality of ultracapacitors. In the description of some embodiments, the term ultracapacitor might refer to one or more arrays of individual ultracapacitors. For example, in one embodiment the term ultracapacitor refers to an array of 144 individual capacitors, each having a capacitance of 2600 F and being capable of providing 2.5 V continuous DC current at between 400 and 600 A.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for starting up a fuel cell hybrid electric vehicle, the fuel cell hybrid electric vehicle having a battery, an air delivery compressor, an ultracapacitor-based propulsion energy storage, at least one DC-to-DC converter, and at least one electric propulsion motor, the method comprising:
electrically connecting the battery to the propulsion energy storage;
charging the propulsion energy storage with the battery to a predetermined level associated with powering an air delivery compressor;
disconnecting the battery from the propulsion energy storage;
electrically connecting the propulsion energy storage to the air delivery compressor;
operating the air delivery compressor using charge from the propulsion energy storage to provide a predetermined quantity of air to the fuel cell; and
causing the fuel cell to generate electricity,
wherein, during the charging the propulsion energy storage, the predetermined level of propulsion energy storage charge comprises a predetermined voltage level associated with an amount of stored energy required to power the air delivery compressor for sufficient time to start up the fuel cell, and charging the propulsion energy storage comprises boosting the voltage of the battery to the predetermined voltage level and transmitting energy from the battery to the propulsion energy storage.

2. The method of claim 1, wherein the causing the fuel cell to generate electricity comprises applying an electric load across the fuel cell such that supplied air and fuel are used by the fuel cell in approximately stoichiometric balance.

3. The method of claim 2, further wherein applying the electric load across the fuel cell comprises supplying the electricity generated by the fuel cell to power vehicle accessories.

4. The method of claim 1, further comprising determining an amount of charge on the propulsion energy storage prior to performing the step of electrically connecting the battery to the propulsion energy storage.

5. A method for starting up a fuel cell hybrid electric vehicle, the fuel cell hybrid electric vehicle having a battery, an air delivery compressor, an ultracapacitor-based propulsion energy storage, at least one DC-to-DC converter, and at least one electric propulsion motor, the method comprising:
electrically connecting the battery to the propulsion energy storage;
charging the propulsion energy storage with the battery to a predetermined level associated with powering an air delivery compressor;
disconnecting the battery from the propulsion energy storage;
electrically connecting the propulsion energy storage to the air delivery compressor;
operating the air delivery compressor using charge from the propulsion energy storage to provide a predetermined quantity of air to the fuel cell; and
causing the fuel cell to generate electricity,
wherein the fuel cell hybrid electric vehicle also includes a DC bus configured to transfer propulsion power between the propulsion energy storage, the fuel cell, and the at least one electric propulsion motor; and,
wherein the operating the air delivery compressor using charge from the propulsion energy storage includes boosting voltage of the DC bus from a propulsion energy storage voltage to a bus voltage, transmitting power from the DC bus, bucking the bus voltage to a compressor voltage, and powering the air delivery compressor at the compressor voltage.

6. A method for starting up a fuel cell hybrid electric vehicle, the fuel cell hybrid electric vehicle having a battery, an air delivery compressor, an ultracapacitor-based propulsion energy storage, at least one DC-to-DC converter, and at least one electric propulsion motor, the method comprising:
electrically connecting the battery to the propulsion energy storage;
charging the propulsion energy storage with the battery to a predetermined level associated with powering an air delivery compressor;
disconnecting the battery from the propulsion energy storage;
electrically connecting the propulsion energy storage to the air delivery compressor;
operating the air delivery compressor using charge from the propulsion energy storage to provide a predetermined quantity of air to the fuel cell; and
causing the fuel cell to generate electricity,
wherein the fuel cell hybrid electric vehicle also includes a DC bus configured to transfer propulsion power between the propulsion energy storage, the fuel cell, and the at least one electric propulsion motor, the fuel cell hybrid electric vehicle further including a DC-to-DC converter electrically in series between the fuel cell and the DC bus, and wherein the air delivery compressor is electrically in parallel with the fuel cell with reference to the DC-to-DC converter;
wherein the electrically connecting the propulsion energy storage to the air delivery compressor comprises electrically connecting the propulsion energy storage to the air delivery compressor via the DC bus and the DC-to-DC converter; and,
the method further comprising powering the air delivery compressor with the fuel cell in response to the causing the fuel cell to generate electricity.

7. A system controller installable in a fuel cell hybrid electric vehicle and comprising a computer readable medium having computer executable program code embodied thereon, the computer executable program code configured to cause the system controller to initiate power generation of a fuel cell when installed in the fuel cell hybrid electric vehicle by performing the steps of:
electrically connecting a start up battery to an ultracapacitor-based propulsion energy storage;
charging the ultracapacitor-based propulsion energy storage with the start up battery to a predetermined voltage level associated with powering an air delivery compressor for a predetermined amount of time;
disconnecting the start up battery from the ultracapacitor-based propulsion energy storage;
electrically connecting the ultracapacitor-based propulsion energy storage to the air delivery compressor;

operating the air delivery compressor using the charge on the ultracapacitor-based propulsion energy storage to provide a predetermined quantity of air to the fuel cell; and causing the fuel cell to generate electricity, using the electricity generated by the fuel cell including transmitting electricity across a shared high-voltage DC bus, wherein the steps of charging the ultracapacitor-based propulsion energy storage, operating the air delivery compressor, and using the electricity generated by the fuel cell include transmitting electricity across the shared high-voltage DC bus, and charging the propulsion energy storage comprises commanding a DC-to-DC converter to boost the voltage of the shared high-voltage DC bus from that of the start up battery to the predetermined voltage level, and transmitting energy from the shared high-voltage DC bus to the ultracapacitor-based propulsion energy storage.

8. The system controller of claim 7, wherein further comprising powering the air delivery compressor with the fuel cell in response to the causing the fuel cell to generate electricity.

* * * * *